(No Model.) 3 Sheets—Sheet 1.
B. C. WHITE.
MOLDING APPARATUS.
No. 600,188. Patented Mar. 8, 1898.
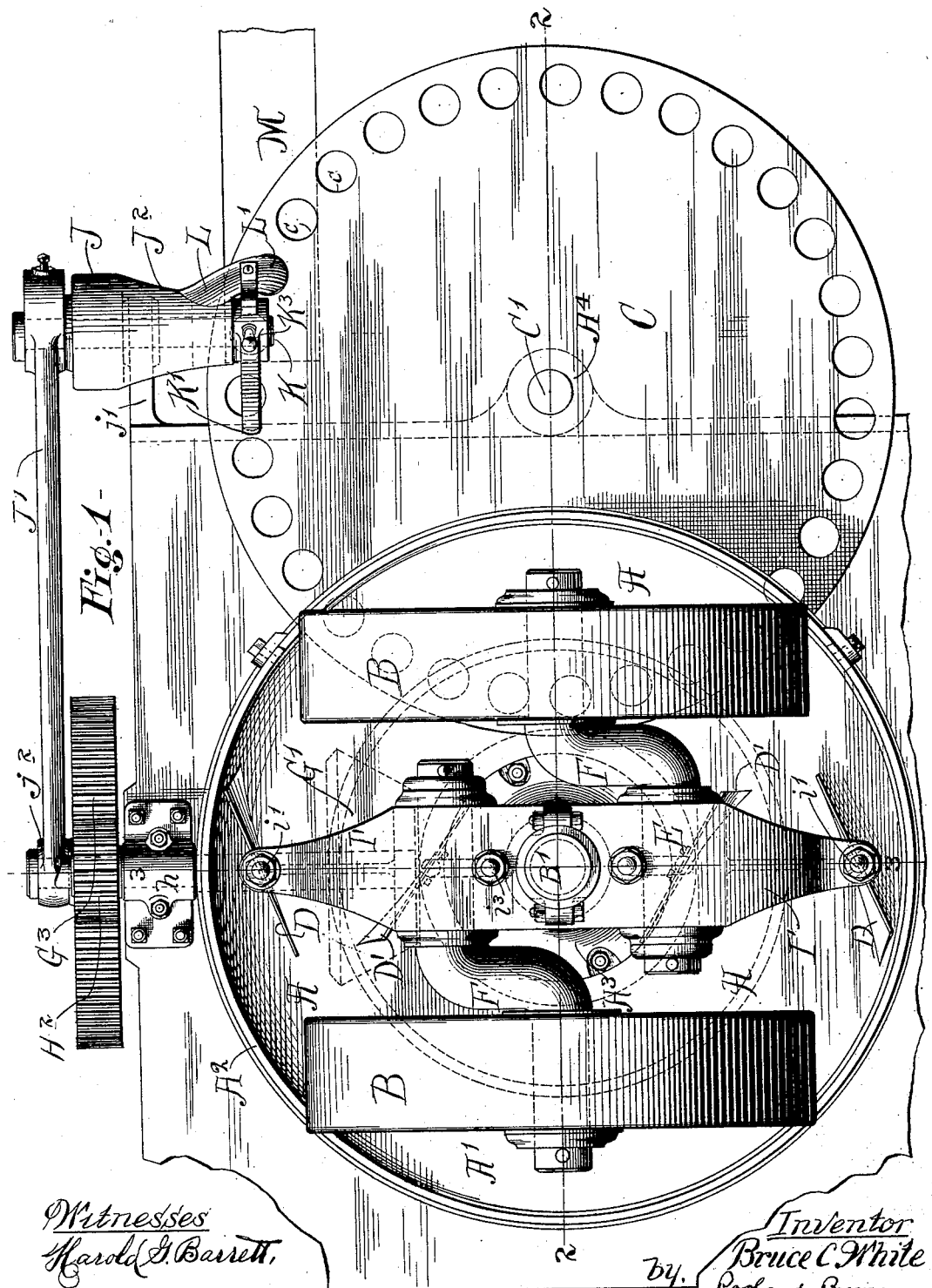
Witnesses
Harold G. Barrett,
R. Cuthbert Vivian.
Inventor
Bruce C. White
by Poole & Brown
his Attorneys

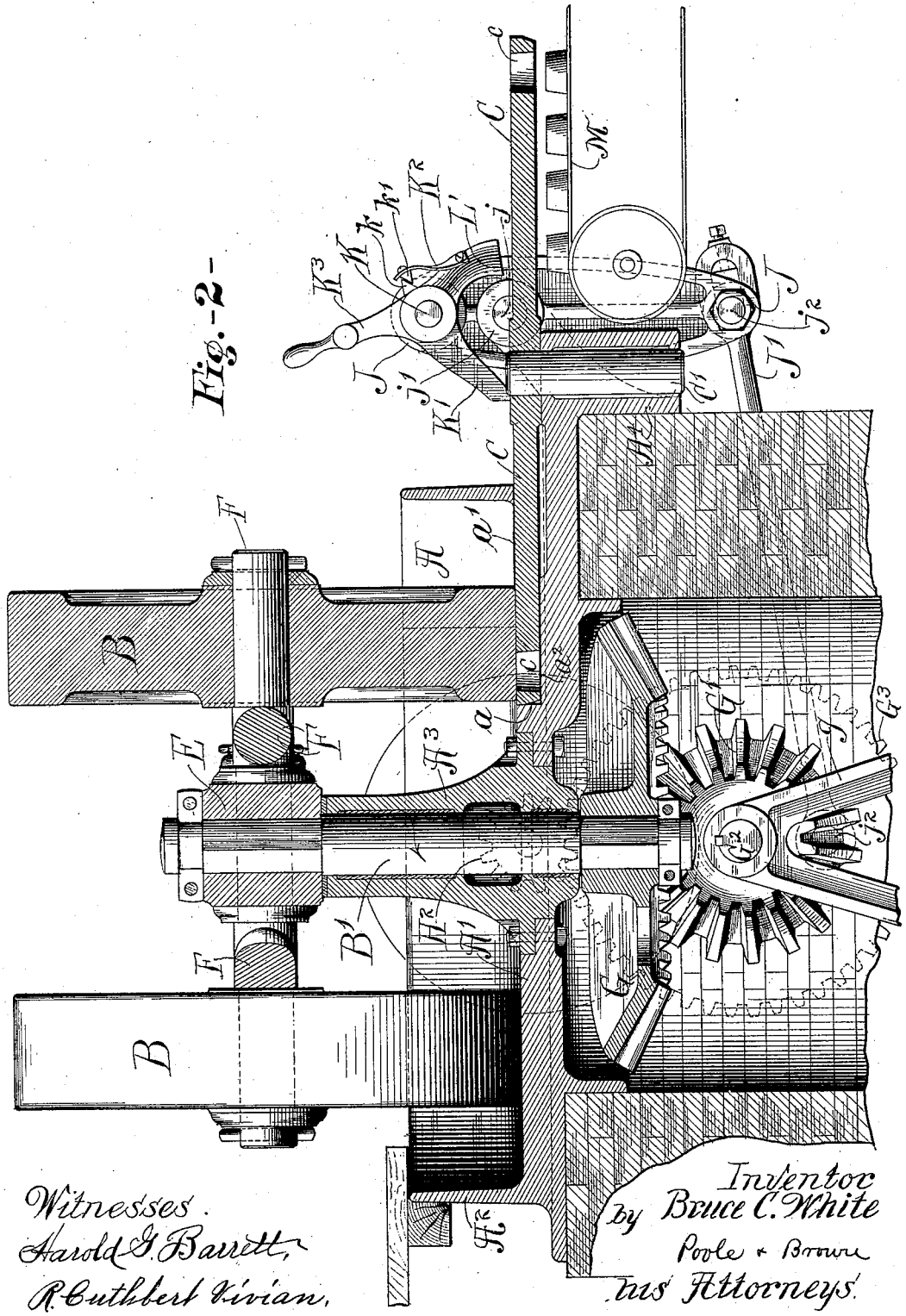

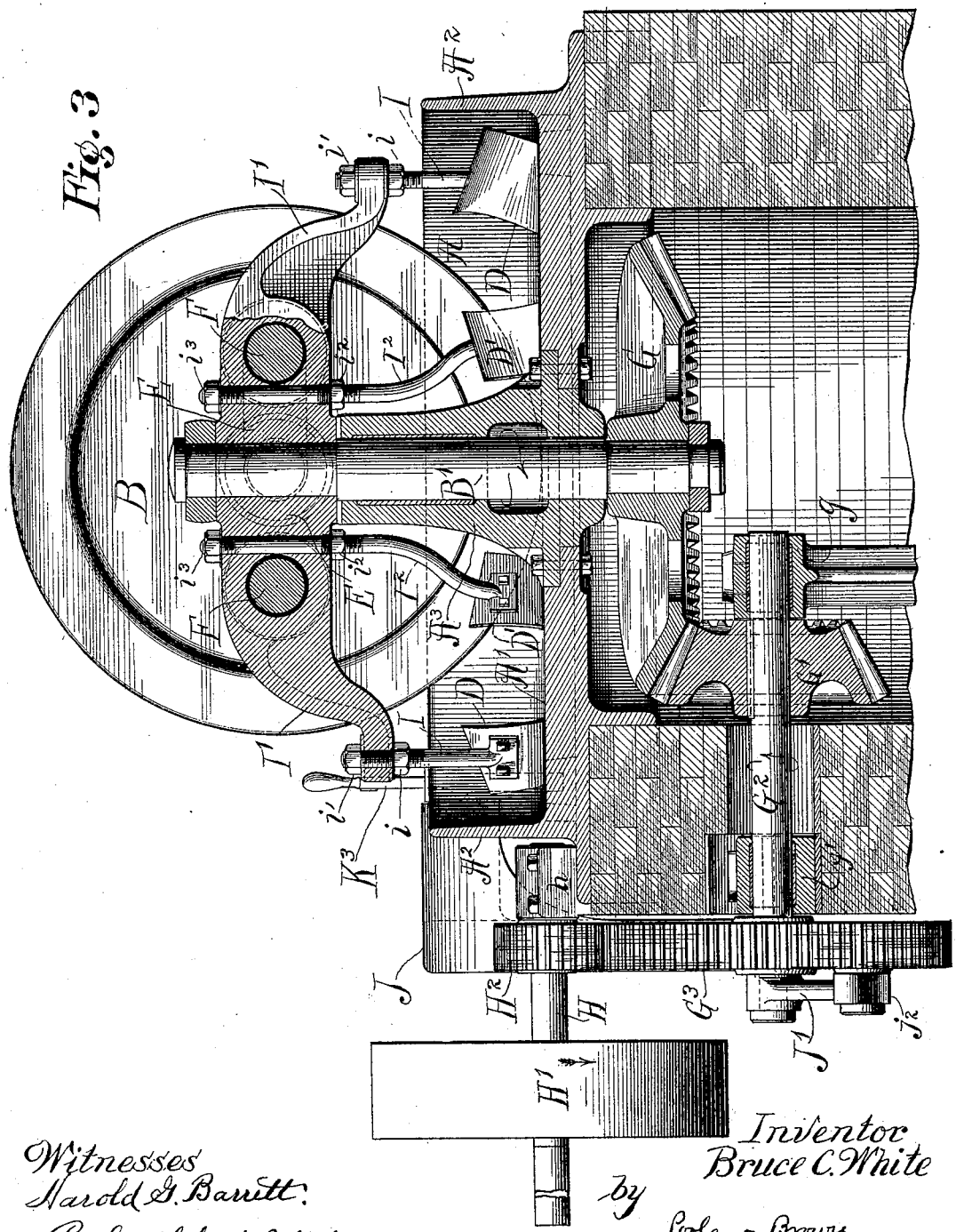

UNITED STATES PATENT OFFICE.

BRUCE CLARK WHITE, OF CHICAGO, ILLINOIS.

MOLDING APPARATUS.

SPECIFICATION forming part of Letters Patent No. 600,188, dated March 8, 1898.

Application filed July 6, 1896. Serial No. 598,132. (No model.)

*To all whom it may concern:*

Be it known that I, BRUCE CLARK WHITE, of Chicago, in the county of Cook and State of Illinois, have invented certain new and useful Improvements in Molding Apparatus; and I do hereby declare that the following is a full, clear, and exact description thereof, reference being had to the accompanying drawings, and to the letters of reference marked thereon, which form a part of this specification.

This invention relates to a novel machine or apparatus for molding or giving a solid form to materials which are naturally plastic or granular substances containing sufficient adhesive material to adapt them to be shaped by pressure in molds.

A machine or apparatus embodying my invention may be employed in the making of solid bricks or blocks from finely-divided (pulverized) ores, flue-dust, or concentrates, such as are used in smelting operations or the making of granular or pulverulent fuel into bricks or blocks suitable for burning.

The invention consists in the matters hereinafter described, and pointed out in the appended claims.

An apparatus embodying my invention embraces as its main elements the features commonly employed in grinding or pulverizing apparatus of the kind known as "chasing-mills"—that is to say, an apparatus embracing a pan or annular bed or receptacle for the material and heavy rollers resting on the material in the pan and in which either the pan or the roller is driven or revolved, so that the roller travels over the material in the pan, together with a mold or molds located in the bottom of the pan or a portion of said bottom and over which the rollers pass in the action of the apparatus, so that the molds will be filled and the material therein packed or solidified by the action of said rollers when passing over such mold or molds.

The features above referred to are the main or principal ones constituting an apparatus embodying my invention; but in the accompanying drawings I have shown means by which molds may be brought successively into position for being filled by the action of the rollers, devices for discharging the material from the filled molds, and other features which add to the practical value and utility of the apparatus and which also constitute important parts of the invention.

In the accompanying drawings I have shown one simple embodiment of my invention as a means of illustrating the essential features thereof.

As shown in said drawings, Figure 1 is a plan view of an apparatus embodying the invention. Fig. 2 is a vertical section thereof, taken on line 2 2 of Fig. 1. Fig. 3 is a vertical section thereof, taken on line 3 3 of Fig. 1.

As illustrated in said drawings, A indicates a pan or circular trough containing the material to be operated upon.

B B indicate heavy rollers which rest and travel on the bottom of the pan A, and C a mold-plate which contains recesses $c$ $c$, constituting the molds in which the material is pressed or packed, said mold-plate being so arranged as to form a part of the bottom of the pan A on which the said rollers travel.

In the apparatus herein shown the pan or receptacle A is stationary, and the rollers B B move or travel in a circular path and rest on the bottom of the pan, as is common in a familiar class of chasing-mills, while a separate mold-plate is provided which is revolubly mounted to turn in a horizontal plane about a center located at one side of the pan and having the molds formed in its marginal part, which latter is adapted to extend within or beneath the path of the rollers and to take the place of a part of the bottom of the pan, which is removed or cut away to afford space for said mold-plate, the top of which latter is in the part which enters the pan flush with the bottom of the pan. In connection with traveling rollers, pan, and mold-plate thus arranged I propose to employ plows or scrapers D D', which revolve with the rollers and act to throw the material in the pan from either side of the path of the rollers into the center of said path, thereby insuring constant action of the rollers on such material and facilitating its delivery over and into said molds.

Now, referring to the mechanical features illustrated in the pan, the rollers, and means for giving motion to the rollers, these parts are constructed as follows: The pan consists, as shown, of a single casting having a horizontal bottom wall A' and a side wall or curb $A^2$. At the center of the pan is secured a hollow standard $A^3$, which forms a bearing for a vertical shaft B', through the medium of which the said rollers are driven. Attached to the upper end of said shaft is a cross-head E, in the outer parts of which are formed bearing-apertures for the inner ends of two crank-shaped arms F F, on the outer ends of which the said rollers are journaled. The intermediate or crank portions of said arms are arranged horizontally, so that the rollers are free to move or yield in a vertical direction by the swinging of said arms in their bearings in the cross-head E. Said shaft B' has attached to its lower end a beveled gear-wheel G, which intermeshes with a beveled pinion G', attached to a horizontal driving-shaft $G^2$, which is mounted in suitable bearings $g$ $g'$ below the pan A.

H indicates a counter-shaft provided with a belt-pulley H' and also with a gear-pinion $H^2$, which intermeshes with a gear-wheel $G^3$ on the shaft $G^2$. Said shaft H is mounted in suitable bearings, one of which, $h$, is shown attached to or located at one side of the pan A, as clearly seen in Figs. 1 and 3.

The plows D D', employed for throwing the material toward the path of the rollers, are arranged obliquely with respect to radial lines of the pan at such angles that they will throw or deflect the material toward the path of the rollers. Said plows are attached to and carried by the cross-head E. The outer plows D are shown as attached to vertical stems I, which pass at their outer ends through arms or brackets I' I', which form extensions of the ends of the cross-head and are herein shown as made integral therewith. Said stems are adjustably secured to said brackets by means of nuts $i$ $i'$, located on the screw-threaded parts of the stems above and below said brackets. The inner plows D' are shown as attached to stems $I^2$, which pass upwardly through vertical passages in the cross-head E and are adjustably secured to the cross-head by means of nuts $i^2$ $i^3$, located on the screw-threaded parts of said stems above and below the cross-head, in the manner illustrated.

Now, referring to the mold-plate C and parts operating in connection therewith, the same are constructed as follows: Said mold-plate C is of a circular or disk form and is shown as secured to a short vertical shaft C', which turns in a bearing $A^4$, which for convenience may be cast on one side of the pan A. The bed of said pan is cut away at its side adjacent to the plate C to a depth equal to the thickness of the said plate, so as to form a recess $a$, Fig. 2, adapted to receive the marginal part of said plate, said recess being, as seen in the plan view, conformed to the curved periphery of the mold-plate, so that when the latter is in place within the recess the top of the mold-plate will be flush with and form a continuation of the flat bottom surface of the pan. The wall or curb $A^2$ of the pan is of course provided with a slot or opening $a'$ to admit the passage of the mold-plate, as clearly seen in the drawings. The flat bottom surface $a^2$ of the recess $a^2$ in its part beneath the molds $c$ is arranged to form a flat bearing-surface for contact with the mold-plate, such surface $a^2$ thus forming a bottom for the several molds, which have the form of recesses or openings extending through said plate from top to bottom when said molds rest over said surface $a^2$.

A device is provided for intermittingly turning or rotating the plate C to bring the molds successively into position to be filled, which is constructed as follows: J is a rocking arm which is located at one side of the mold-plate C in a generally vertical position and is mounted on a pivot-stud $j$, which engages the rocking arm near its upper end. Said pivot-stud $j$ is shown as secured in a bracket $j'$, attached to a part of the bed A'. At its lower end the arm J is pivotally connected with a pitman J', the opposite end of which engages a wrist-pin $j^2$, secured in the outer face of the gear-wheel $G^3$, hereinbefore mentioned. In the upper end of said rocking arm J is mounted a rock-shaft K, which overhangs the mold-plate C and is provided with a pawl-arm K', which is rigidly attached to the shaft and is adapted to engage at its free end with suitably-arranged teeth or shoulders on the said plate, the parts being so arranged that as the rocking arm J is actuated through its connection with the wheel G the pawl-arm K' will receive reciprocatory movement, and by its engagement with the annularly-arranged series of teeth or shoulders on said mold-plate will turn the latter a short distance at each stroke of the rocking arm. For convenience said pawl-arm is located over the annularly-arranged molds $c$ and is adapted to engage at its free end with the side wall of said molds, which are thus made to constitute the teeth or shoulders by which the plate is actuated. To provide means for holding the said pawl K' with its free end elevated or away from the mold-plate, so as to hold the actuating devices out of action when desired, the pivoted end of the pawl is shown as provided with a V-shaped tooth or projection $k$, which is adapted to engage a correspondingly-shaped projection $k'$, attached to a spring-arm $K^2$, which is supported from the arm J. Said pawl is also provided at its upper end with a rigid hand-lever $K^3$, by which the pawl may be lifted by hand. When said projection $k$ is above the tooth $k'$ on the spring, the pawl-arm will be in operative position and its free end will be free to rise and fall as it passes from one of the molds to the next one behind it. Upon the pawl-arm being lifted by pressure applied to the hand-lever $K^3$ until the projection $k$ passes below the projection $k'$ on the spring the free end of the arm will be held in its elevated position by the action of the spring and the lug thereon, the tension of said spring being sufficient to prevent the projection $k$ from passing said lug and to thereby prevent the descent of the free end of the pawl-arm.

It follows from the construction described that each time the shaft G² performs a rotation the pawl-arm K' will be moved, so as to turn the mold-plate through the angular distance equal to the distance apart of two adjacent molds. The devices for driving the mold-plate are so arranged, moreover, that the motion of said plate shall be intermittent and occur only when the rollers B B are resting on the solid or stationary part of the pan. As shown in the drawings, the gear-wheels G and G' are so proportioned that the pawl-arm will make two strokes at each rotation of the shaft B', which carries the rollers, and the movement of the pawl is timed to take place when the rollers are free from said mold-plate.

It follows from the construction set forth that the mold-plate is intermittingly moved during the operation of the machine, so as to carry the filled molds from the path of the rollers and to a point outside of the pan, where the material which has been forced into the molds by the action of the rollers may be removed from said molds.

I have shown in the accompanying drawings a simple device by which the molded blocks or bricks are automatically dislodged from the molds, these parts being constructed as follows: Attached to the upper end of the rocking arm J is a rigid arm L, the free end of which extends over the path of the molds c and is so shaped as to form a punch or plunger L', adapted to enter the molds from above and thrust the contents thereof outwardly from the bottom of the mold-plate. Said arm L is shown in the drawings, Fig. 1, as formed on or attached to an inwardly-extending hub J², which constitutes an inward extension of the upper end of the rocking arm J and a bearing for the rock-shaft K, as well as a support for the said arm L. It will of course be seen that the said rocking arm J, the hub J², and the arm L' constitute in effect a rocking support for the plunger L, by which the latter is supported in such manner that it may turn or oscillate about the shaft j' as a center, said shaft j' being arranged with its central axis at about the level of the top of the plate C, so that the motion of the plunger L is approximately vertical, and it acts on the contents of the mold, therefore, in an approximately vertical direction, so as to push the contents of the mold directly downward out of the latter. The action of said plunger L' takes place when the mold-plate is stationary and at the time the pawl-arm K' is being drawn backwardly from engagement with one mold into position for engagement with the next mold behind it. The said plunger will therefore act successively on the molds as they pass beneath it to discharge the blocks of compressed material one by one from the molds.

The blocks of molded material as they are discharged from the mold-plate may be received on a suitably-arranged supporting-surface and thence removed to a place where they may be dried or otherwise disposed of. As herein shown, a traveling belt M is arranged beneath the mold-plate in position to receive the molded blocks as they are discharged from said plate.

The operation of the apparatus described is as follows: The material to be molded into shape is deposited in the pan and by the action of the rollers thereupon is distributed throughout the bottom of the pan and also over the part of the mold-plate within the same, portions of such material which are carried over the molds being forced into the latter by the action of the rollers. The material will be compressed in the molds gradually by successive actions of the rollers and as fresh material is brought over the molds and into position for entering the same. The said rollers tend to distribute the material equally or uniformly around the circumference of the pan, and such distribution of the material will be aided by the action of the plows, which in throwing or scraping the material toward the center or path of the rolls will tend also to carry the material around in the direction in which the rollers themselves revolve.

The material is preferably deposited in the pan at a point remote from the mold-plate or just in advance of the same, (referring to the direction of motion of the rollers,) so that such material will be acted upon to some extent before it reaches the mold, and thereby subjected to some extent to the grinding and mixing action of the rollers, even though the material has been previously ground or mixed. It is found that the action of the rollers, especially in connection with that of the plows, tends to quickly distribute the material in or along the bottom of the pan, so that material deposited at one point in the pan will in a very short time be carried around to the mold-plate, and the whole body of material in the pan tends to move around the same under the action of the rollers and plows, so that the molds will continue to be supplied so long as any material shall remain in the pan by the material brought to them from other parts of the pan.

By the action of the automatic feeding devices described the mold-plate is automatically and intermittingly turned or moved at times when the rollers are resting on the stationary parts of the pan, so that the filled molds will be gradually carried away from the path of the rollers and outside of the side wall or curb of the pan, while new or unfilled molds will be advanced into the pan and into the path of the rollers. As the filled molds pass outwardly beneath the part of the curb which extends over the mold-plate the surplus material will be scraped therefrom by the lower edge of the said curb, which latter will retain all of the material resting on the top of the outwardly-moving part of the mold-plate. This movement of the mold-plate will be so timed as to give ample opportunity for the filling of each mold before it is carried out of the path of the rollers, and in order to insure the feeding of all of the molds the hand-actuated device above described is employed, by which the feeding-pawl may be held out of engagement with the mold at desired intervals, thereby arresting movement of the plate and giving sufficient time for the filling of the molds, as may be ascertained through observation of the filling process, by the person operating the machine.

The material to be operated upon may be inserted in the pan after having been previously ground or mixed or otherwise reduced to condition for immediate insertion in the molds, or the apparatus itself may be employed to grind, reduce, or mix the materials, in which case the contents of the pan may be subjected to the action of the rollers to a greater or less extent before the operation of molding begins. In any case, however, the rolls will operate to grind and mix the material to some extent during the operation of filling the molds. When the apparatus is employed for grinding or mixing the material preparatory to its introduction into the molds, the mold-plate may, if necessary or desirable, be allowed to remain immovable during the time the mixing and grinding operation is taking place. In such case, after the charge of material inserted in the pan has been sufficiently ground and mixed, the actuating device for the mold-plate will be thrown into action and the molding of the material will proceed as before described. It may of course occur that in such preliminary grinding or mixing operation the molds which rest within the pan at the time the material is first introduced therein may be filled by insufficiently ground or mixed portions of the material, but this will be of little consequence, because a few molds only will be so filled and the contents thereof may be discharged and discarded without any material inconvenience or loss.

It will of course be understood that the material will be operated upon when in a moist or semidry state and when neither so wet as to be soft and sticky or so dry as not to be adherent or plastic. Thus, for example, in making blocks or bricks from flue-dust or concentrates a charge of the latter will be placed in the pan and with it a relatively small quantity of material having suitable adhesive properties, such as lime, with a necessary quantity of water. The quantity of lime or other adhesive substance used in such case will be limited to that necessary to make the particles adhere to each other when forced into the molds by the action of the rollers, it being of course understood that the blocks or bricks of molded material will be hard and solid when discharged from the molds, owing to the small quantity of moisture within the same.

The blocks or bricks of compressed material molded by the use of the apparatus described possess to a high degree the desirable qualities of solidity or compactness. This result arises mainly from the action of the rollers in compressing the material into the molds, the same being forced or compressed within said molds by direct and repeated action of the rollers, by which the material is thoroughly compacted and the air forced from the same. I have found in practice that the results produced are superior to those obtained by the use of apparatus in the nature of a brick-press, in which plungers are forced into the molds with great pressure, while at the same time the apparatus employed is much more simple to construct and much more easily operated than such presses.

In addition to the general advantages obtained by the use of the revolving rolls as a means of forcing the material into the molds, as above described, a specific advantage is obtained, which arises from the fact that the action of the rollers on the material in the pan tends to better prepare the material for compression in the molds by compressing and solidifying the same, with the result of bringing the particles thereof into close and intimate contact, thereby excluding air and changing it from a more or less granular form into a compact and homogeneous mass. This may be better understood from consideration of the following facts:

The action on the material to be acted upon of a device in the nature of a chasing-mill depends upon the character and condition of such material. When the material is in a perfectly dry state, the rollers operate to crush the same and reduce it to powder, while at the same time mixing the ingredients. Similarly when the material is in a very wet or semiliquid state the rollers operate to grind or reduce the particles and mix the same. In operating upon plastic substances which are only slightly moist, however, the rollers have a different action, inasmuch as they not only tend to reduce and mix the same, but to press or compact it into a solid and homogeneous mass. The material in the latter case remains to a considerable extent in its compressed condition after being pressed and squeezed, as well as mixed or "pugged," by the action of the heavy grinding-rollers. It follows from the above that not only will the molds be filled compactly and solidly by the material compressed therein by the action of the rollers, but the material itself is by the action of the said rollers condensed and solidified and deprived of all interstices or air-spaces, so that it enters the mold in a solid and homogeneous state.

While I have herein shown the apparatus embodying my invention in the form of a chasing-mill and have for convenience employed the term "pan" to describe the annular receptacle or bed on which the rollers act, it is to be understood that such receptacle or bed may be made otherwise than in the particular form shown, and that the term "pan" is not intended to mean a receptacle of the particular form of construction heretofore used in chasing-mills, but includes an annular receptacle or bed of any suitable construction.

I have shown the mold-recesses in the mold-plate as made circular in form, so as to give blocks of approximately cylindric shape; but this is for the purpose of illustration only, and the molds may be made of square shape of the form of ordinary building-brick or of any other desired configuration. Obviously when a mold-plate is employed having openings extending therethrough in connection with a flat supporting-surface beneath the mold-recesses the molded blocks will have flat and parallel top and bottom surfaces; but as far as the more general features of the invention are concerned molds which discharge otherwise than through the bottom of the mold-plate may obviously be employed, and such molds when used may be made of any desired form or configuration on their lower or inner as well as on their side walls.

I claim as my invention—

1. A combined grinding and molding apparatus comprising an annular bed, a roller which acts thereon in a circular path and a movable mold-plate, the top surface of which forms part of the surface of the bed and which is provided with mold-recesses located in and occupying a part of the path of the roller, those portions of the bed in the path of the roller and of the plate in the path of the roller not occupied by the mold-recess, in connection with the roller affording a means for grinding and mixing the material resting on the bed and also for feeding the material to the mold through the movement of the material along the path of the roller.

2. A grinding and molding apparatus comprising a stationary annular bed, a revolving roller resting thereon, a circular rotary mold-plate which forms a part of the bed, the top surface of which is flush with the bed and which is provided with annularly-arranged mold-recesses adapted to be brought successively into the path of the roller by the rotary movement of the mold-plate and means for giving rotary movement to said mold-plate, those parts of the bed and the mold-plate in the path of the roller, not occupied by the mold-recesses, serving with the roller as a means of mixing and grinding the material and also as a means of feeding the material from the bed to the mold-recesses.

3. A grinding and molding apparatus comprising a stationary bed, a revolving roller resting thereon, and forming therewith a means for grinding and mixing the material placed on the bed and a circular revolving mold-plate which forms a part of the bed, the top surface of which is flush with the bed and which is provided with mold-recesses extending therethrough from top to bottom, and which by the movement of the mold-plate are brought successively into the path of the roller and in position to receive the material carried along in said path by the action of the roller, said bed being provided with a horizontal bearing-surface beneath the mold-plate which closes the bottoms of said mold-recesses when the latter are within the path of the roller.

4. A grinding and molding apparatus comprising a stationary bed, a revolving roller resting thereon and forming therewith a means for grinding and mixing the material placed on the bed and a rotary mold-plate of circular shape which forms a part of the bed and the top surface of which is flush with the latter, said plate being provided with mold-recesses extending therethrough from top to bottom and which by the movement of the mold-plate are brought successively into the path of the roller and in position to receive the material carried along in said path by the action of the roller, said bed being provided with a horizontal bearing-surface beneath the mold-plate which closes the bottoms of said mold-recesses when the latter are within the path of the roller and with a wall or curb through which the said mold-plate extends and by which the material resting on the plate is scraped therefrom as the plate moves outwardly beneath it, and means for actuating said mold-plate.

5. The combination with a stationary annular bed and a revolving roller resting thereon, of a circular, rotary mold-plate which forms a part of the bed, the top surface of which is flush with the top of the bed and which is provided with annularly-arranged mold-recesses adapted to be brought successively into the path of the roller as the plate is turned and driving connections for the roller and mold-plate, constructed to turn the same intermittingly and at times when the roller is resting on the bed and is free from the mold-plate.

6. The combination with a stationary annular bed, and a revolving roller, of a rotary mold-plate, containing mold-recesses extending therethrough from top to bottom, and means for actuating the mold-plate and discharging the molds embracing a vertically-arranged rocking arm, a feed-pawl carried by the arm and engaging the mold-plate, and a plunger attached to said arm and adapted to enter the recesses in the movement of the arm.

7. A molding apparatus comprising a stationary annular bed, a revolving roller, a circular rotary mold-plate forming part of the bed, means for giving intermittent rotary movement to said mold-plate, and means for discharging the compressed material from the mold-plate.

In testimony that I claim the foregoing as my invention I affix my signature, in presence of two witnesses, this 3d day of July, A. D. 1896.

BRUCE CLARK WHITE.

Witnesses:
C. CLARENCE POOLE,
WILLIAM L. HALL.